United States Patent [19]

Jubenville

[11] 4,443,322
[45] Apr. 17, 1984

[54] CONTINUOUS PROCESS AND APPARATUS FOR SEPARATING HYDROCARBONS FROM EARTH PARTICLES AND SAND

[75] Inventor: Duncan B. Jubenville, Windsor, Canada

[73] Assignee: TekSonix, Inc., Commerce City, Colo.

[21] Appl. No.: 409,168

[22] Filed: Aug. 18, 1982

Related U.S. Application Data

[62] Division of Ser. No. 213,956, Dec. 8, 1980, Pat. No. 4,358,373.

[51] Int. Cl.³ .............................................. C10G 1/04
[52] U.S. Cl. ............................. 208/11 LE; 208/8 LE
[58] Field of Search ............... 208/8 LE, 8 R, 11 LE, 208/11 R

[56] References Cited

U.S. PATENT DOCUMENTS

| | | | |
|---|---|---|---|
| 2,973,312 | 2/1961 | Logan | 208/11 LE |
| 3,017,342 | 1/1962 | Bulat et al. | 208/11 LE |
| 3,497,005 | 2/1970 | Polopsky et al. | 208/11 LE |
| 4,054,505 | 10/1977 | Hart et al. | 208/11 LE |
| 4,054,506 | 10/1977 | Hart et al. | 208/11 LE |
| 4,151,067 | 4/1979 | Gron | 208/11 LE |
| 4,358,373 | 11/1982 | Jubenville | 208/11 LE |

FOREIGN PATENT DOCUMENTS 756078  4/1967  Canada .......................... 208/11 LE

*Primary Examiner*—Delbert E. Gantz
*Assistant Examiner*—A. Pal
*Attorney, Agent, or Firm*—Hugh Adam Kirk

[57] ABSTRACT

Earth and sand containing bitumen, tar, and/or oil is broken down to particle sizes that can be suspended in water as a carrier for the particles, so that the suspension can be pumped upwardly through an inclined duct or separator where the suspended particles are subjected to horizontal ultrasonic vibrations of between about 18 and 27 kiloHertz for a period between about 5 and 10 minutes. These vibrations completely separate the hydrocarbons from the earth and sand, and entrap gases in the heavier-than-water hydrocarbons so that all the hydrocarbons float to the top of the duct or ultrasonic separator to form a layer which can easily be withdrawn. The cleaned earth and solid particles settle behind a baffled and perforated partition along and above the lower side of the duct or unit, from which lower side these cleaned particles can be removed. The water carrier is withdrawn near the upper end of the separator below the hydrocarbon layer, and recirculated to the lower end of the separator for suspending more hydrocarbon-containing particles.

11 Claims, 3 Drawing Figures

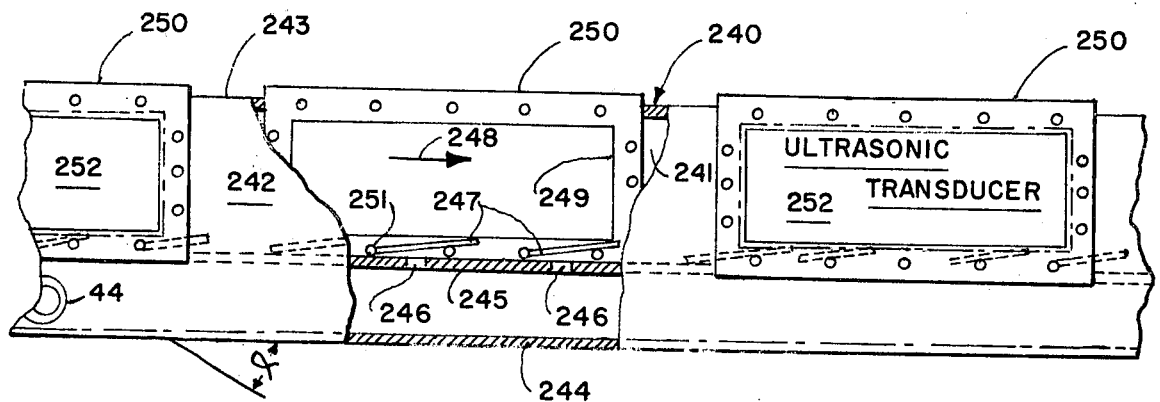
FIG. II
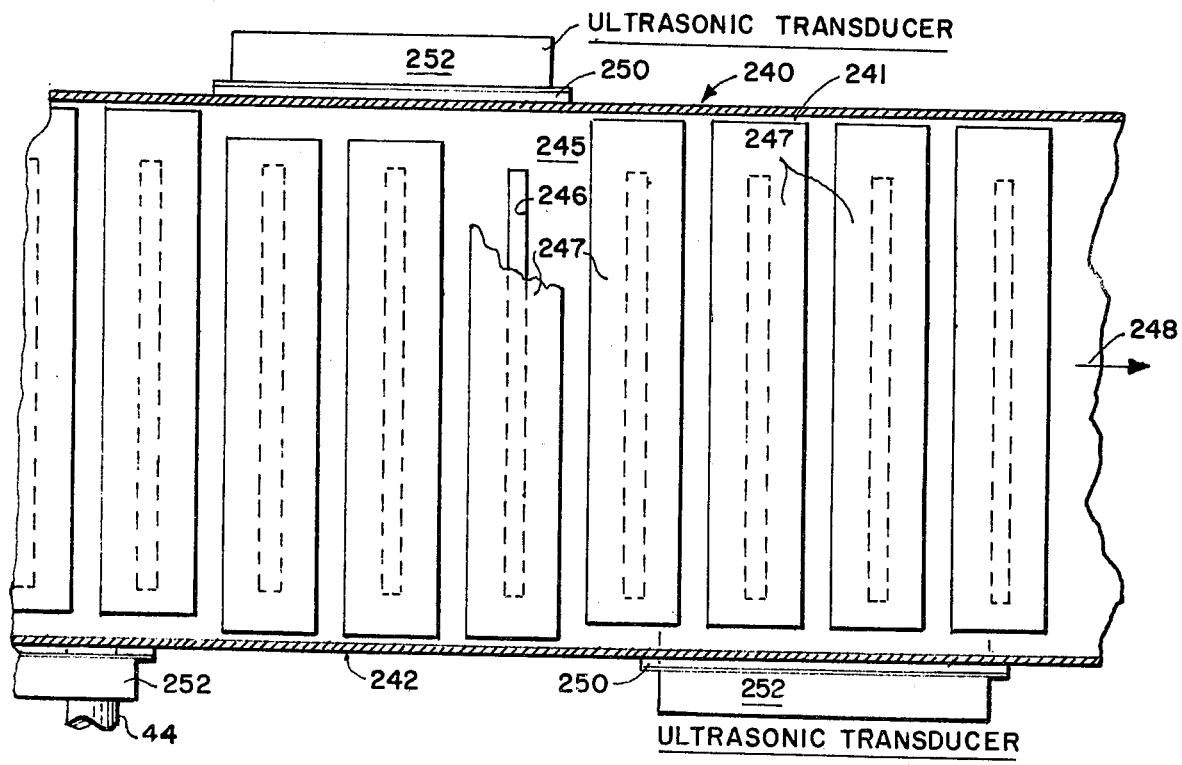
FIG. III

CONTINUOUS PROCESS AND APPARATUS FOR SEPARATING HYDROCARBONS FROM EARTH PARTICLES AND SAND This is a division of application Ser. No. 06/213,956 filed Dec. 8, 1980 now U.S. Pat. No. 4,358,373 issued Nov. 9, 1982.

BACKGROUND OF THE INVENTION

Ultrasonic treatment of aqueous suspensions for the removal of organic materials including bitumens from oil sands are known, but none of the known processes employ the applicant's above combination of steps and conditions. Some of the most pertinent patents disclosing this prior art are:

| Bodine | 3,123,546 | Mar. 3, 1964 | 208-11 |
|---|---|---|---|
| Bodine, Jr. | Canadian 710,135 | May 25, 1965 | 166-26 |
| Bodine | 3,189,536 | June 15, 1965 | 208-11 |
| Williams | Canadian 756,078 | Apr. 4, 1967 | 196-11 |
| Pelopsky et al | 3,497,005 | Feb. 24, 1970 | 166-247 |
| Felix et al | Canadian 917,103 | Dec. 19, 1972 | 166-26 |
| Halloway et al | 3,849,196 | Nov. 19, 1974 | 134-1 |
| Baswick | Canadian 996,485 | Sept. 7, 1976 | 196-30 |
| Fisher et al | 4,049,053 | Sept. 20, 1977 | 166-249 |
| Ducote | 4,062,696 | Dec. 13, 1977 | 134-1 |
| Wallace | 4,118,282 | Oct. 3, 1978 | 201-2.5 |
| Vermeulen et al | 4,136,014 | Jan. 23, 1979 | 208-11 |
| Grow | 4,151,067 | Apr. 24, 1979 | 208-11 |

The sonic treatment of suspensions with aeration is also known as shown by the following patents:

| Sasaki | 2,907,455 | Oct. 6, 1959 | 209-5 |
|---|---|---|---|
| Weston | 3,202,281 | Aug. 24, 1965 | 209-166 |
| Wohlert | 4,045,243 | Aug. 30, 1977 | 134-1 |

The previous most successful sonic treatment of particles containing bitumen and oil has been by suspending the particles in a solvent or with an additive. Such processes have the disadvantage of involving chemical disposal problems and the requirement of a continuous supply of chemicals. Applicant's invention does not employ any chemicals including solvents in his separation process. However, some of these sonic treating solvent and/or chemical added processes are disclosed in the following patents:

| Morrell et al | 2,722,498 | Nov. 1, 1955 | 196-14 |
|---|---|---|---|
| Logan | 2,973,312 | Feb. 28, 1961 | 208-11 |
| Bulat | Canadian 633,063 | Dec. 19, 1961 | 208-8 |
| Bulat et al | 3,017,342 | Jan. 16, 1962 | 208-11 |
| Duff | Canadian 733,481 | May 3, 1966 | 196-11 |
| Hart Jr. et al | 4,054,505 | Oct. 18, 1977 | 208-11 |
| Hart Jr. et al | 4,054,506 | Oct. 18, 1977 | 208-11 |

Agitation together with aeration of particles is also known, but not agitation at ultrasonic frequencies, which processes are disclosed in the following patents:

| Eyre | 2,790,750 | Apr. 30, 1957 | 196-1 |
|---|---|---|---|

| Clark | Canadian 889,284 | Dec. 28, 1971 | 196-11 |
|---|---|---|---|
| Evans et al | Canadian 918,091 | Jan. 2, 1973 | 196-30 |
| Schutte | 3,869,384 | Mar. 4, 1975 | 210-44 |

Also agitation in hot water for treating suspensions for the removal of organic compounds is also known from the following patents:

| Camp | Canadian 874,418 | June 29, 1971 | 196-11 |
|---|---|---|---|
| Maloney | Canadian 982,966 | Feb. 3, 1976 | 196-24 |
| Bain et al | 4,018,664 | Apr. 19, 1977 | 208-11 |

Thus, although many of the separate features of applicant's invention are known in the prior art as mentioned above, there is no known continuous process and/or apparatus therefor which employs applicant's specific combination of relatively low ultrasonic frequencies and exposing such frequencies to the particles to be separated for such a relatively long period of time. Some known specific apparati for separation of suspensions containing organic material are listed below:

| Coulson et al | 2,885,339 | May 5, 1959 | 208-11 |
|---|---|---|---|
| Clem | 2,550,776 | May 1, 1951 | 92-44 |
| Eyre | 2,790,750 | Apr. 30, 1957 | 196-1 |
| Logan | 2,973,312 | Feb. 28, 1961 | 208-11 |
| Bodine | 3,189,536 | June 15, 1965 | 208-11 |
| Williams | Canadian 756,078 | Apr. 4, 1967 | 196-11 |
| Halloway et al | 3,849,196 | Nov. 19, 1974 | 134-1 |

SUMMARY OF THE INVENTION

The process for the separation of bitumens, tars and oil or hydrocarbons from earth and sands according to the process of this invention is also adaptable for the removal of oil from shales and of bitumens from tailings from oil sand separation processes where there still is 2% or 3% of bitumen left on the sands, and also for the recovery of oil from spent lubricating oils used in engines, and the like.

The particles from which the hydrocarbons are to be separated are broken such as by rollers to a size less than about two centimeters in diameter and preferably less than about one-half centimeter and much smaller so that they can be suspended easily in water as an aqueous carrier for these particles, and so that the suspension can be pumped easily. This suspension contains at least about 50% by weight water.

The suspension is pumped upwardly through an inclined duct of an ultrasonic separator at an angle which may vary from 1° or 2° to 90°, but most generally at an angle between about 25° and 30°. This inclined duct or separator has a longitudinal apertured partition spaced above its lower or bottom wall so as to form two parallel duct sections or chambers in the separator, one above the other; the upper chamber or section being the larger and having alternately located along its vertical parallel sides ultrasonic transducers for vibrating the particles in the suspension to remove the hydrocarbons therefrom. This upper chamber or section communicates with the lower chamber or section by a plurality of transverse slots covered by baffles angled upwardly in the direction of flow of the suspension, which slots permit the heavier earth and sand particles to settle under the baffles into the lower section for removal at spaced intervals along the lower side or bottom wall of the separator. Thus the suspension is pumped and flows upwardly through the larger duct section of the ultrasonic separator.

In order to obtain sufficient dwell time or exposure of between about 5 and 10 minutes for the particles to the ultrasonic vibrations, the separator may have to be quite long if a relatively high flow rate is employed. Such a long separator may be made less cumbersome by dividing it into a series of overlapping parallel inclined ultrasonic separator units with the top end of one unit connected by a pipe to the bottom end of the next unit. Thus there may be as many as five more or less units in a given plant. The solid particles may be removed from the lower ends of the lower sections of each unit, but usually not at the bottom of the first or second unit because the flow of the suspension up through the units carries with it the earth and sand particles until they have been vibrated for at least about 5 minutes and preferably about 6 to 8 minutes, to be completely separated from their bituminous coatings. This relatively long ultrasonic vibration treating time produces cavitation of gases in the bitumen particles which are more dense than water to make them more buoyant, causing them to float to the top of the last separator unit and form an easily decantable layer with the other hydrocarbons removed from the earth and sand particles.

The water carrier is also removed from the last separator unit below the accumulated hydrocarbon layer and recycled into a spray mixing chamber for the suspension of the particles to be introduced into the ultrasonic separator unit. If desired, this water can be passed through a heat exchanger where the temperature thereof may be raised up to about 90° C. and usually between about 75° and 80° C. to aid in the separation of certain types of hydrocarbons impregnating inorganic or heavier solids.

If desired, the decanted or removed hydrocarbon layer may be transferred to a mixing tank and chemicals added thereto if it is too viscous for easy pumping or transport.

The sediments of earth, oil and sand which collect below the baffles in the ultrasonic separating unit may be continuously removed from near the bottom of these units from the lower duct sections therein, with relatively little water, so that they can be directly returned to the earth as clean particles uncontaminated with any chemicals, thus not only preserving but improving the environment from whence they were originally taken as being contaminated with hydrocarbons. In fact, the tailing ponds from previous hot water oil sand separation processes can be supplied with a barge having thereon the apparatus for the process of this invention, which could continuously rework these tailings to recover more hydrocarbons from them that cannot be or were not removed by the previous hot water or steam treating process.

OBJECTS AND ADVANTAGES

Accordingly, it is an object of this invention to produce a simple, economic, efficient, effective, continuous, and self-containing process and apparatus for removing bitumens, tars and oils from inorganic solid particles such as earth and sand.

Another object is to provide such a separation process which overcomes the difficulties and problems of known prior art processes.

Another object is to produce such a process in which no solvents or chemicals are needed for the separation and thereby no contamination or pollution of the environment occurs since no disposal problems are involved.

Another object is to produce such a process in which only water is used as a carrier, which water is cleaned, reused and/or recycled and thereby this process can be used in places where water is not abundant.

Another object is to produce a continuous process which completely separates all organic materials and/or hydrocarbons such as bitumens, oils and tars from emulsions, soils, earth and sands, permitting the particles to be returned directly to the environment cleaner than they were removed.

Another object is to produce a process and apparatus whereby the tailings of previous oil-removing processes for oil sands can be further treated to recover more hydrocarbons.

Another object is to produce a process whereby even the bituminous products which are heavier than water can be caused to float in the water suspension by producing gaseous cavitation in these bituminous products.

BRIEF DESCRIPTION OF THE DRAWINGS

The above mentioned and other features, objects and advantages, and a manner of attaining them are described more specifically below by reference to an embodiment of the invention shown in the accompanying drawings wherein:

FIG. I is a schematic flow diagram of the process according to a preferred embodiment of this invention;

Figure 1:
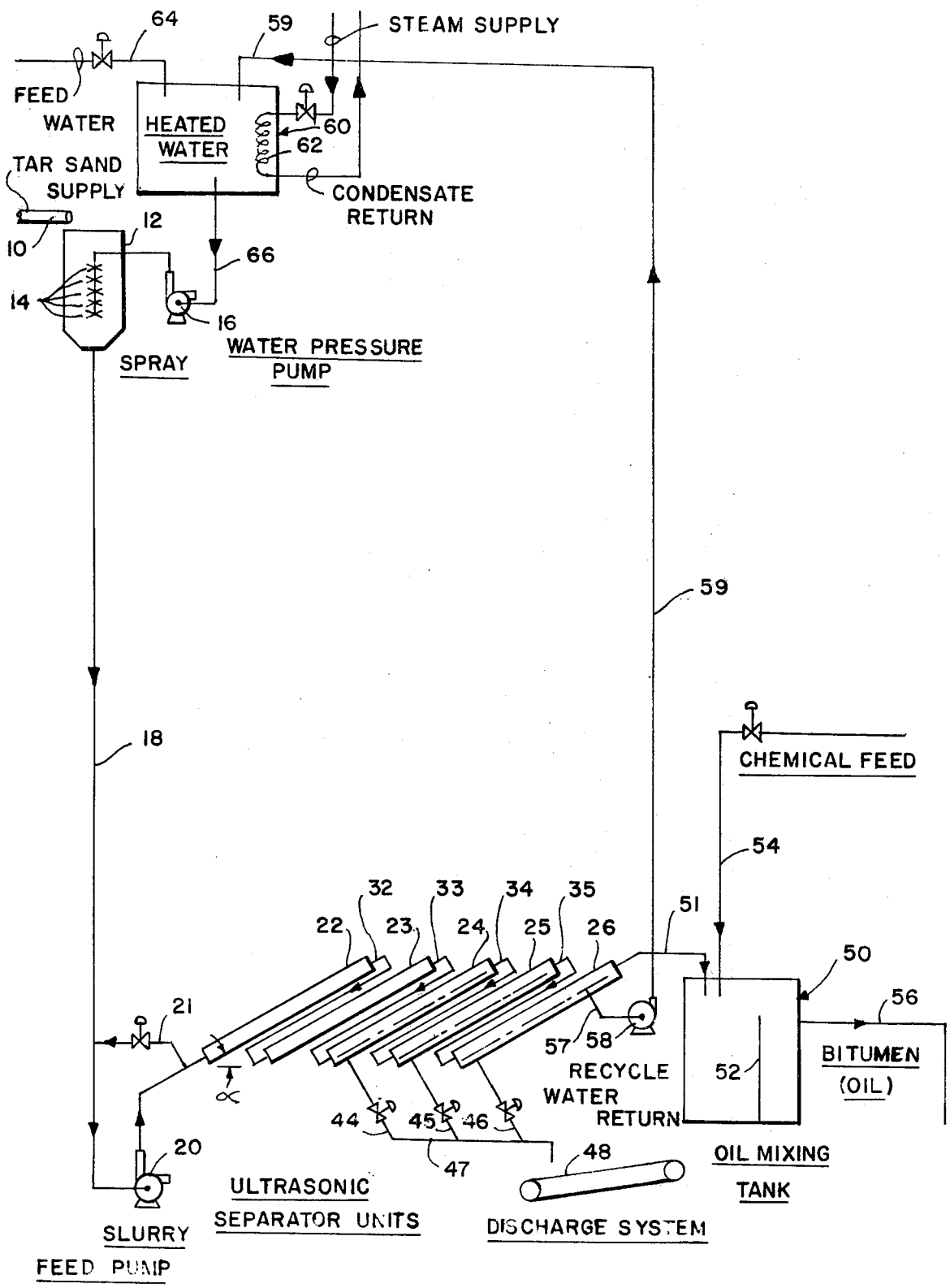

FIG. II is an enlarged detailed view of the side of a portion of one of the ultrasonic separator units shown in FIG. I with a part thereof broken away;

FIG. III is a plan view of the section of the separator unit shown in FIG. II with its top wall broken away.

DETAILED DESCRIPTION OF PREFERRED EMBODIMENTS

A. Process

Referring first to FIG. I, there is disclosed a schematic flow diagram of a process of this invention for the separation of bitumen from tar sand tailings, which process could be mounted on a barge floated in the pond of the tailings. This barge could dredge up the tailings at its one end, process them, and discharge the clean sands and earth particles from its other end. It could employ only the water in the pond as the carrier for the tailings through the apparatus of the process.

More specifically, the tar sand tailings may be introduced from a conveyor 10 into a spray hopper 12 which may comprise a plurality of central water spray nozzles 14 for water from a pump 16 under sufficient pressure to insure that the tailings are broken into small enough size to be suspended in the water. The pressurized water spray may be heated to a temperaure below its boiling point, preferably less than about 95° C., and usually to between about 70° and 80° C. The resulting suspension is then pumped from duct 18 by a pump 20 into the ultrasonic separator units 22 through 26, successively, which comprise specifically designed ducts as disclosed in FIGS. II and III and described in Section B below. These inclined ducts may be set at an angle alpha ($\alpha$)

which may vary from 1° or 2° up to 90°, but preferably between about 25° and 30° as those shown in FIG. I. These ducts are successively connected together through pipes 32, 33, 34, 35 and 36, respectively.

In order to control the flow and the time of the contact of the particles suspended in the water in the ultrasonic separator or separator units 22–26, there may be provided a valve bypass duct 21 around the pump 20. These ultrasonic separator units 22 through 26 are each provided along their opposite parallel vertical sides alternately with ultrasonic transducers so that the liquid or water carrying in suspension the particles to be separated are continuously exposed, transversely to their direction of flow, to horizontal vibrations between the range of about 18 and 27 kiloHertz per second, and preferably about 20 to 25 kiloHertz, for a time of at least five and less than about ten minutes, and preferably between about six and eight minutes. This relatively long treatment at a relatively low ultrasonic frequency not only completely removes all of the organic material or hydrocarbons, such as bitumens, tars, and oil, still clinging onto the tailings, but also produces by cavitation gas entrained in the heavier bitumen particles so as they will become less dense than water and float to the top of the last separator unit 26 for removal into an oil mixing tank 50 through the duct 51 with the other removed hydrocarbons that are less dense than water. This tank 50 may have a partition 52 and may have fed therein a chemical or solvent through valved duct 54 to treat any removed tars or bitumens which are too viscous to flow easily through the outlet duct 56.

The clean solids, sediments, sand and earth particles heavier than the water settle mostly in the last separator units 24, 25 and 26, which separator units are divided longitudinally by partitions with baffled slots or apertures so that these solid particles can escape through these slots from the current flow of the water carrier through the units, and can settle near the bottoms of the units below the partitions, and can readily be drawn off, even continuously, through the valved pipes 44, 45 and 46 and discharged into a common manifold 47 for deposit upon a conveyor 48 for return to the environment as clean, uncontaminated and unpolluted earth and sand. Although each of the ultrasonic separating units 22 through 26 are provided along their full lengths with ultrasonic transducers, only the latter may be provided with the longitudinal partition or baffles for separating the cleaned inorganic solid particles. However, such partitions may be provided in all of the units 22 through 26, as desired, and the sand may be removed from each one of them as is shown for the ducts 44 through 46 on the last three units 24 through 26.

The water used as the carrier is removed from the last ultrasonic separator unit 26 near its upper end but below the level of the floating hydrocarbons via a pipe 57 and is pumped by pump 58 and pipe 59 to a water heater 60 having a steam coil 62 wherein the water may be raised to the temperature previously described for introduction into the spray unit 12. Make-up water can be introduced into this tank 60 via valved pipe 64, and the withdrawal of the heated water is through duct 66 to pressure pump 16.

The heat or steam supply for heating the coil 62 and the water in the tank 60 may be provided from a low-pressure boiler which may be heated by the oil recovered from the process of this invention. Thus the process is self-contained. The only large quantity additive being water, which is recycled through the process, and originally may be obtained from the pond upon which the barge of the apparatus floats.

B. The Apparatus

Referring to FIGS. II and III there is shown a portion of one of the ultrasonic separator units 22 through 26, such as the lower end of unit 24, in which the duct 240 is provided with two vertical parallel side walls 241 and 242, a top wall 243, a bottom wall 244, and an intermediate perforated or slotted partition wall 245 parallel to the top and bottom walls and spaced between about one-fourth and one-third of the distance between the top and bottom walls from the bottom wall 244. Since all of the separators 22 through 26 are the same throughout their lengths, FIGS. II and III are representative of sections taken anywhere along any of them. The slots 246 regularly spaced along the length of the partition wall 245 and transverse thereof, are covered by upwardly angular baffles 247 angled in the direction of flow of the aqueous suspension through the duct as indicated by the arrows 248 so that the flow of the liquid upwardly through the duct at the angle $\alpha$ will not easily flow back and downwardly through the slots 246, but permit the separated solids to settle beneath the baffles 247 and flow down through the slots 246 and collect in the lower smaller chamber of the duct 240 between the partition 245 and bottom wall 244, where they may be intermittently or continuously removed through the duct 44. These baffles 247 preferably are hinged at 251 and ganged together so that they can be adjusted to compensate for different rates of settling particles.

Alternately on opposite sides of the duct or separator unit 240, in apertures 249 in the side walls 241 and 242, are provided mounting frames 250 in which are removably mounted ultrasonic transducers 252, which project high frequency beams of energy across the upper larger section duct horizontally and transversely of the flow 248 of the liquid suspension through the upper duct section. Thus the particles in the suspension pumped through the upper portion of the duct are continuously exposed as they pass or flow between the partition 245 and top wall 240 and two side walls 241 and 242. These transducers 252 are mounted all along each of the ultrasonic separator units 22 through 26, and are separated from the duct 240 by flexible vibrating plates mounted in the frames 250. Since these plates are vertical, the accumulation of gas bubbles on them does not occur to cause any piercing or rupture thereof, as would be the case if they were located in the top wall 243 of the duct 240. Furthermore, if they were located in the bottom wall 244 of the duct, they could accumulate hydrocarbons which would insulate their vibrations from the particles flowing through the duct. For example, this particular separator unit or duct 240 may have a width of three feet, a height or thickness of one foot and a length of about 40 to 50 feet. The rectangular frames 250 for the transducers 252 may be about eight by eighteen inches, and the height of the upper section duct may be eight inches and that of the lower section duct for accumulation of the sediments may be about three and a half inches.

The other parts of the apparatus may be of conventional construction, namely the pumps 16, 20 and 58, as are the piping and valves connecting them to the other units of the apparatus.

The spray tank 12 may have a tapered bottom and comprise pressure nozzles suspended down in the center of the tank.

The bituminous oil mixing tank 50 may contain the partition 52 so that as the hydrocarbons or bitumen is collected and mixed with a chemical to decrease its viscosity, the lower viscosity bitumen oil may easily flow over the top edge of the partition 52 into the other portion of the tank for withdrawal through the pipe 56, through which it may be easily pumped.

The water heater 60 may comprise a tank with a steam coil 62 therein and may be of any conventional size or shape as may be required, depending upon the volume of the system and the amount of water to be mixed with the oil sands or hydrocarbon impregnated particles to be treated and for carrying these particles through the ultrasonic separator units 22 through 26.

C. Examples

A pilot plant sample of five gallons of tar sand tailings from an Alberta tar sand hot water separation process were pumped through a rectangular vertical tower duct ultrasonic separator about 14 feet high, one foot wide and eight inches thick, along opposite eight inch sides of which separator tower duct were placed three ultrasonic transducers having a frequency of 24 kiloHertz. These transducers were staggered two on one side and one on the other side of the tower on the parallel vertical walls thereof. The water that was mixed with the tailings was recirculated from near the top of the tower to the bottom by means of a pump and the bitumen that had been coating the sands were skimmed from the top of the tower in a heavy bituminous layer. The clean sand was accumulated in three baffles below each of the transducers, which baffles angularly extended from the insides of the tower up into the upward flow of the suspension. The edge of the baffles caused turbulence in the flow to keep the suspended particles mixed in the water carrier so as to insure all of the particles were contacted several times by the transverse horizontal vibrations from the ultrasonic transducers. In the V-trough junction of each of these baffles with the vertical walls was an opening for the withdrawal of the sediment and clean sand that collected in these junctions. The duration of the suspension in the tower was about seven minutes and it was found that the lowest baffle junction collected mostly clean sand, the intermediate baffle junction collected clean sand and water, and the upper baffle junction collected substantially no sand and mostly water. The sand and water that was drawn from each of the baffle junctions was allowed to settle, and the water become absolutely clear and the sand was completely free of hydrocarbon substances and bitumen.

While there is described above the principles of this invention in connection with specific apparatus, it is to be clearly understood that this description is made only by way of example and not as a limitation to the scope of this invention.

I claim:

1. A continuous process for the separation of hydrocarbons from earth and sand particles containing said hydrocarbons comprising:
   (A) breaking said particles into a size less than about two centimeters in diameter,
   (B) suspending said broken particles in water,
   (C) pumping the suspension of broken particles upwardly through an inclined duct from its lower end,
   (D) subjecting the suspension of particles in and along said duct to horizontal ultrasonic vibrations ranging in frequency between about 18 and 27 kiloHertz so that each particle is exposed to said vibrations for at least about five minutes to separate substantially all of said hydrocarbons from said earth and sand particles and to entrain the densest of said hydrocarbons with gases from cavitation sufficient to cause said densest hydrocarbons to float on said water to the upper end of said duct,
   (E) removing said separated earth and sand particles continuously along the lower side of said inclined duct,
   (F) removing said separated hydrocarbons from the floating layer formed thereof at the upper end of said duct, and
   (G) recycling said water from below said layer at the upper end of said duct to the broken particles pumped into the bottom of said duct.

2. A process according to claim 1 wherein said hydrocarbons include bitumen.

3. A process according to claim 1 wherein said earth and sand particles containing hydrocarbons are tar sands.

4. A process according to claim 1 wherein said earth and sand particles containing hydrocarbons are tar sand tailings.

5. A process according to claim 1 wherein said earth and sand particles containing hydrocarbons are oil shale particles.

6. A process according to claim 1 wherein said particles are broken to a size less than about half a centimeter.

7. A process according to claim 1 wherein said suspension contains at least 50% water by weight.

8. A process according to claim 1 wherein said water is heated to a temperature below about 90° C.

9. A process according to claim 8 wherein said water is heated to a temperature between about 70° and 80° C.

10. A process according to claim 1 wherein said suspension of particles is exposed to ultrasonic vibrations for between about six and ten minutes.

11. A continuous process for the separation of hydrocarbons from a mixture of particles containing said hydrocarbons comprising:
   (A) heating water to a temperature below its boiling point,
   (B) suspending said particles in said heated water,
   (C) pumping the suspension of particles upwardly through an inclined duct from its lower end,
   (D) subjecting the suspension of particles in and along said duct to horizontal ultrasonic vibrations ranging in frequency between about 18 and 27 kiloHertz so that each particle is exposed to said vibrations for at least five minutes to separate substantially all of said hydrocarbons from said particles and to entrain the densest of said hydrocarbons with gases from cavitation sufficient to cause said densest hydrocarbons to float on said water to the upper end of said duct,
   (E) removing said separated hydrocarbons from the floating layer formed thereof at the upper end of said duct,
   (F) removing said separated particles continuously from below the level from which said hydrocarbons are removed, and
   (G) recycling said water from below said layer at the upper end of said duct to the particles pumped into the bottom of said duct.

* * * * *